(12) United States Patent
Chen et al.

(10) Patent No.: US 8,926,849 B2
(45) Date of Patent: Jan. 6, 2015

(54) DIFFRACTION-TYPE 3D DISPLAY ELEMENT AND METHOD FOR FABRICATING THE SAME

(71) Applicant: National Yunlin University of Science and Technology, Douliu City, Yunlin County (TW)

(72) Inventors: Chien-Yue Chen, Douliou (TW); Wen-Chen Hung, Douliu (TW); Yao-Ru Chang, Douliu (TW)

(73) Assignee: National Yunlin University of Science and Technology, Douliu, Yunlin County (TW)

(*) Notice: Subject to any disclaimer, the term of this patent is extended or adjusted under 35 U.S.C. 154(b) by 0 days.

(21) Appl. No.: 13/802,008

(22) Filed: Mar. 13, 2013

(65) Prior Publication Data

US 2013/0193106 A1 Aug. 1, 2013

Related U.S. Application Data

(62) Division of application No. 13/198,080, filed on Aug. 4, 2011, now abandoned.

(51) Int. Cl.
| | |
|---|---|
| *B29D 11/00* | (2006.01) |
| *G02B 5/18* | (2006.01) |
| *G02B 26/08* | (2006.01) |
| *G02B 27/22* | (2006.01) |
| *H04N 13/04* | (2006.01) |

(52) U.S. Cl.
CPC .............. *G02B 5/1857* (2013.01); *G02B 5/1842* (2013.01); *G02B 26/0808* (2013.01); *G02B 27/2214* (2013.01); *G02B 27/225* (2013.01); *H04N 13/0402* (2013.01)
USPC ..................... 216/24; 216/41; 216/58; 216/83

(58) Field of Classification Search
CPC ............... G02B 5/1842; G02B 5/1857; G02B 26/0808; G02B 27/225; G02B 27/2214
USPC ......................................... 216/24, 41, 58, 83
See application file for complete search history.

(56) References Cited

U.S. PATENT DOCUMENTS

| | | | |
|---|---|---|---|
| 7,692,837 B2 * | 4/2010 | Kasai .......................... | 359/212.2 |
| 2001/0026399 A1 * | 10/2001 | Nakabayashi et al. ........ | 359/576 |
| 2003/0008245 A1 * | 1/2003 | Iwasaki et al. ................ | 430/321 |

FOREIGN PATENT DOCUMENTS

TW I289685 11/2007

* cited by examiner

*Primary Examiner* — Shamim Ahmed
(74) *Attorney, Agent, or Firm* — Muncy, Geissler, Olds & Lowe, P.C.

(57) ABSTRACT

A diffraction-type 3D display element is arranged on an image output face of a 3D display device and comprises a first diffraction area and a second diffraction area. The first diffraction area has a plurality of first stepped gratings spaced apart from each other. The second diffraction area has a plurality of second stepped gratings spaced apart from each other. The second diffraction area is adjacent to the first diffraction area and is arranged symmetrically to the first diffraction area with a central line being the symmetric axis. The diffraction-type 3D display element of the invention diffracts the images output by the 3D display device and projects the diffracted images to two different viewing areas to provide 3D images for users.

4 Claims, 9 Drawing Sheets

DIFFRACTION-TYPE 3D DISPLAY ELEMENT AND METHOD FOR FABRICATING THE SAME

CROSS REFERENCE TO RELATED APPLICATIONS

This application is a Divisional of application Ser. No. 13/198,080, filed on Aug. 4, 2011, for which priority is claimed under 35 U.S.C. §120, the entire contents of which are hereby incorporated by reference.

FIELD OF THE INVENTION

The present invention relates to a 3D display element, particularly to a stepped diffraction-type 3D display element.

BACKGROUND OF THE INVENTION

Multimedia has been evolved from a 2D-image technology to a 3D-image technology. As 3D images provide telepresence and give users a sense as if the object were realty presenting before them, 3D-image technology is very promising in telecommunication and multimedia entertainment.

A pair of images of an object captured in different viewing angles is necessary to construct a 3D image. The pair of images is mainly taken with single-lens shooting or twin-lens shooting.

Presenting 3D images with several displays is the simplest way to realize 3D technology, wherein at least two displays must be arranged at different locations according to different viewing angles of the users to present slightly different images. However, multiple displays occupy too much space and are uneconomic for users.

A grating technique uses a parallax barrier to send different images to different viewing angles of the user. However, such a technology is likely to generate scrambled images and results in lower brightness. Besides, inappropriate parallax barrier design may generate moire fringes and reduce image quality.

An R.O.C. patent No. I289685 disclosed an automatic 3D display device and a method thereof, wherein cylindrical lenses are arranged before a matrix-type display to project and present 3D images. However, such a technology has undesirable crosstalk phenomenon which would result in poor 3D display effect.

SUMMARY OF THE INVENTION

The primary objective of the present invention is to improve the 3D display effect of the 3D display technology.

Another objective of the present invention is to solve the problem of crosstalk occurring when different 3D images are respectively projected to the left-eye and right-eye viewing fields through lenses.

To achieve the above-mentioned objectives, the present invention proposes a diffraction-type 3D display element, which is arranged on an image output face of a 3D display device and comprises a first diffraction area and a second diffraction area. The first diffraction area has a plurality of first stepped gratings spaced apart from each other and each having a first stepped incline. The second diffraction area is adjacent to the first diffraction area and has a plurality of second stepped gratings spaced apart from each other and each having a second stepped incline. The second stepped gratings are arranged symmetrically to the first stepped gratings with the central line being the symmetric axis.

The present invention also proposes a method for fabricating a diffraction-type 3D display element, which comprises steps:

S1: cleaning a substrate;

S2: undertaking a first etching process, wherein the first etching process employs a first mask to form a plurality of first flattened areas and a plurality of first recessed areas on the substrate;

S3: aligning a second mask, wherein the second mask is aligned to the borders of the first flattened areas and first recessed areas; and S4: undertaking a second etching process, wherein the second etching process employs the second mask to form second recessed areas on the first flattened areas and the first recessed areas respectively, and wherein each second recessed area is formed at a depth smaller than that of the first recessed area to form a four-step structure.

In the present invention, the diffraction-type 3D display element uses gratings to diffract the images outputted by a 3D display device and present the images in two different viewing fields, whereby to solve the problem that parallax barrier greatly reduces brightness in the conventional technology. The stepped gratings can effectively increase diffraction efficiency and reduce crosstalk, whereby is increased brightness. Besides, the present invention uses a semiconductor manufacturing technology to fabricate four-step stepped gratings in merely two etching processes and thus outperforms the conventional technology in mass-production and fabrication cost.

DETAILED DESCRIPTION OF THE PREFERRED EMBODIMENTS

The technical contents of the present invention are described in detail in cooperation with drawings below.

Figure 1:
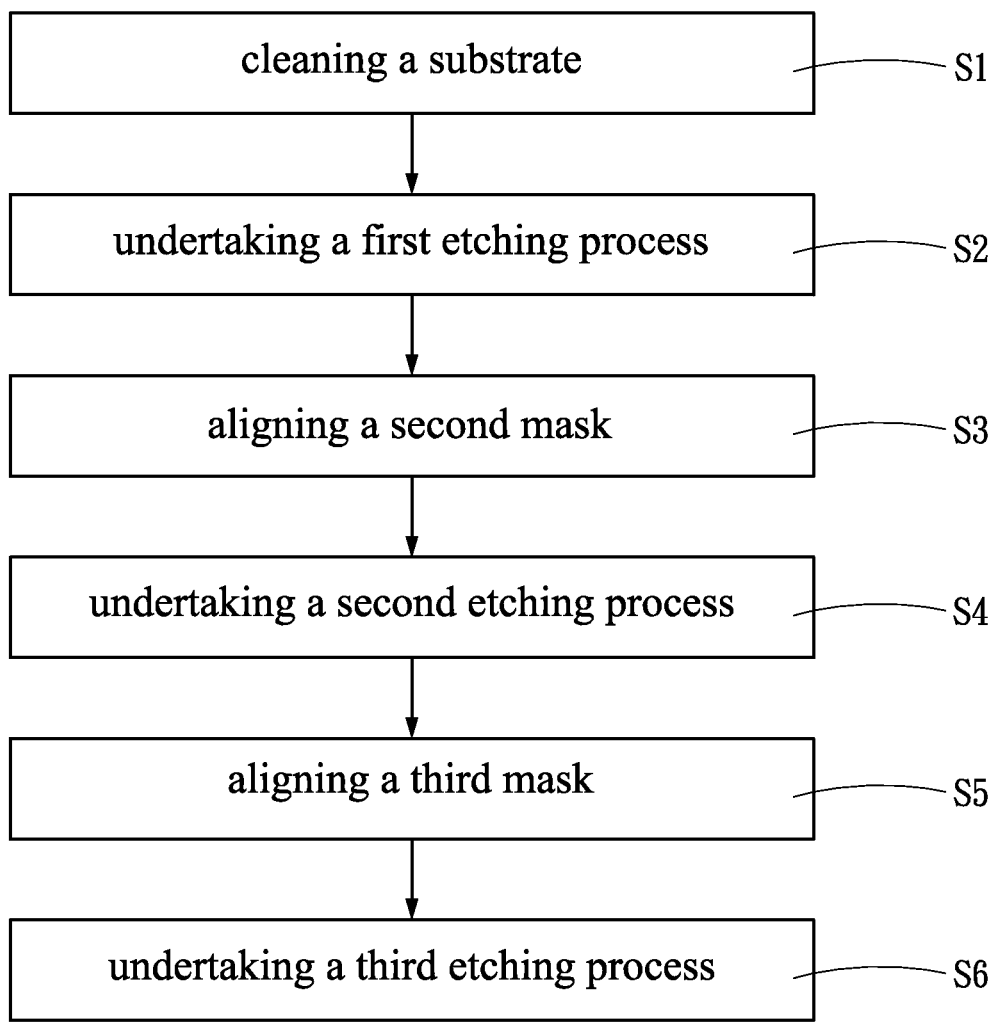
FIG. 1 is a flowchart of fabricating a diffraction-type 3D display element according to one embodiment of the present invention.
Figure 2A:
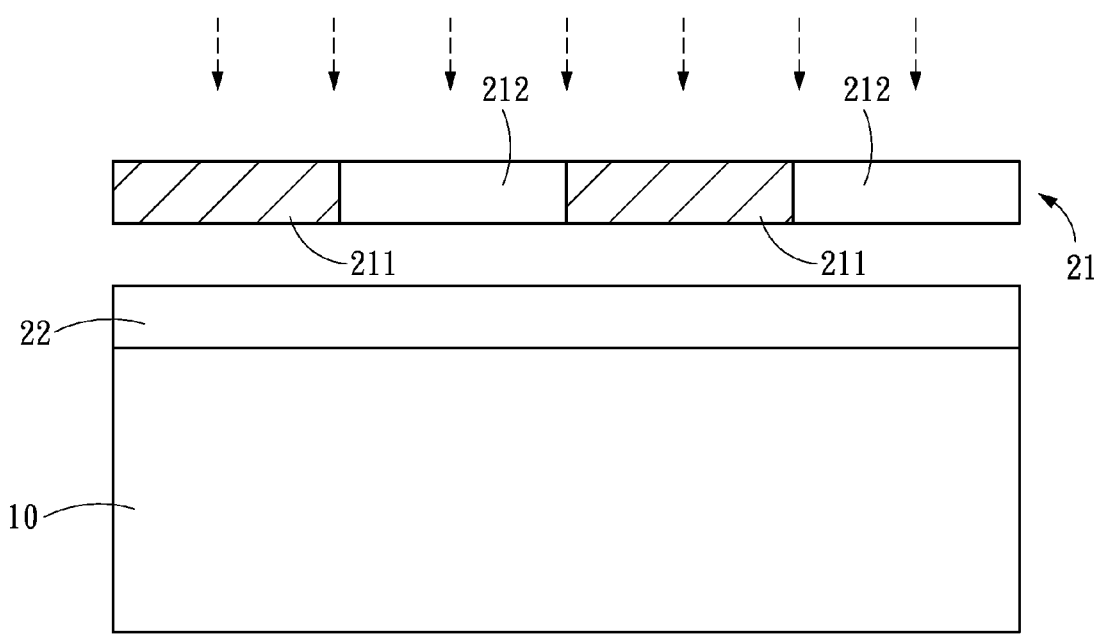
FIGS. 2A-2F are diagrams schematically showing the steps for fabricating a diffraction-type 3D display element according to one embodiment of the present invention.
Figure 2B:
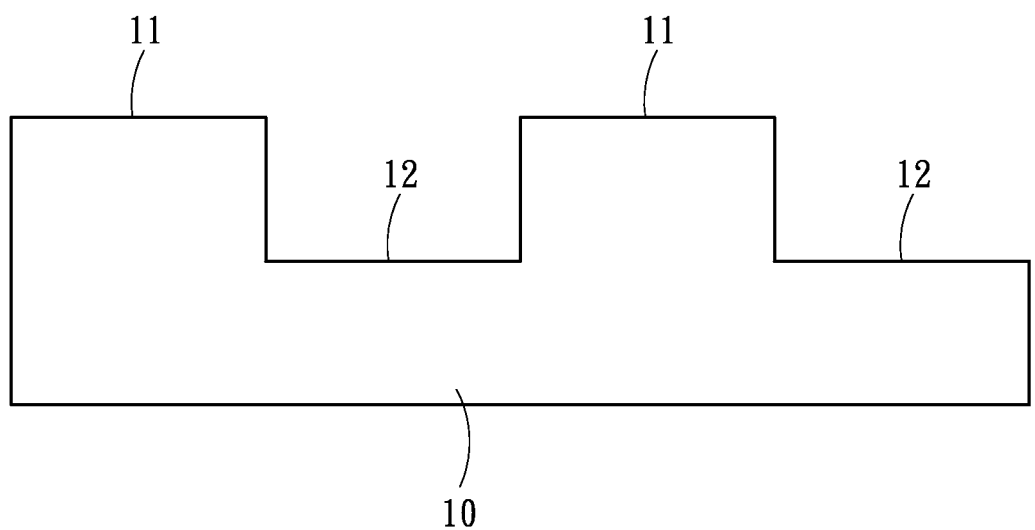
Figure 2C:
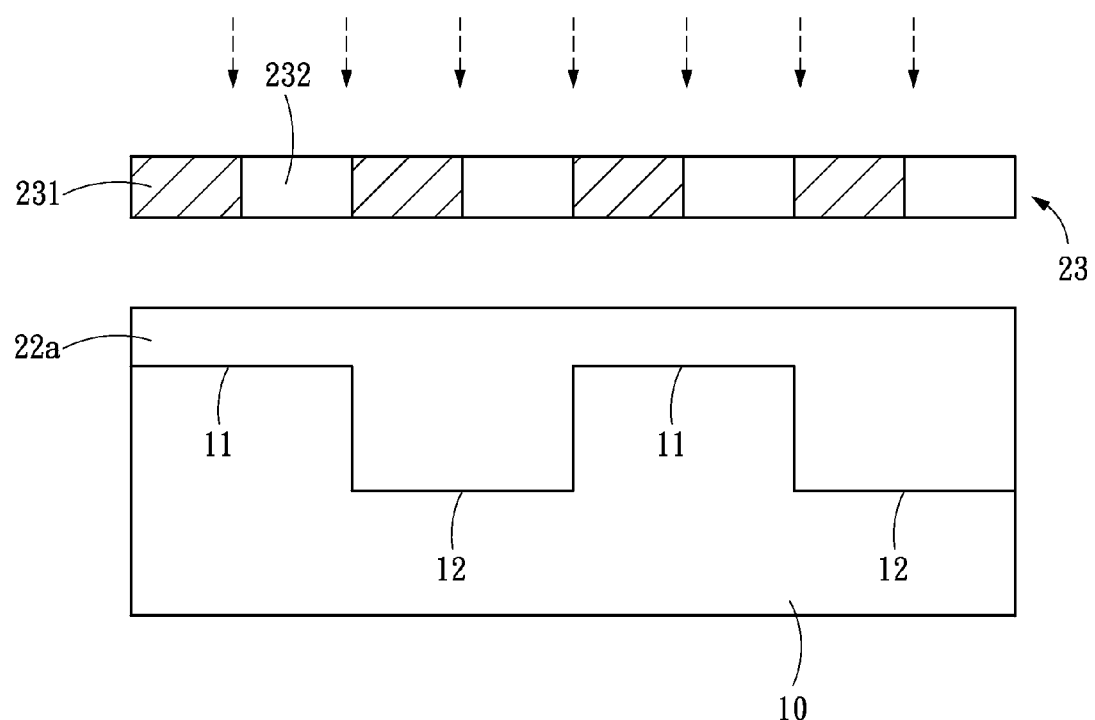
Figure 2D:
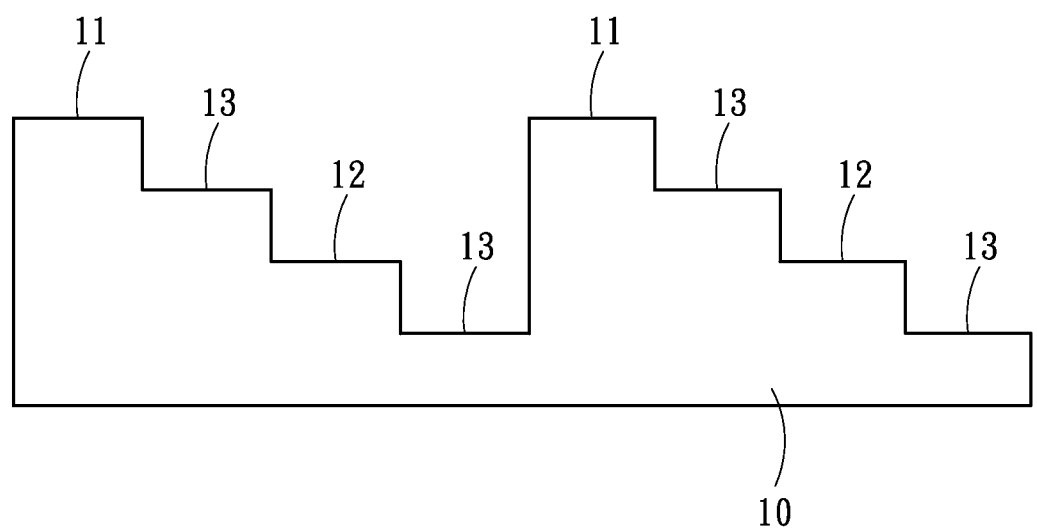

Refer to FIGS. 1-2D. The present invention proposes a method for fabricating a diffraction-type 3D display element, which comprises steps:

Step S1—cleaning a substrate: Use an ultrasonic cleaner with deionized water to clean a substrate 10 and then dry the substrate 10.

Step S2—undertaking a first etching process: As shown in FIG. 2A and FIG. 2B, use a first mask 21 to undertake an etching process to form a plurality of first flattened areas 11 and a plurality of first recessed areas 12 on the substrate 10. It should be noted that the substrate 10 is coated with a photoresist 22 to cooperate with the first mask 21 to implement the first etching process. The first mask 21 has a plurality of first light-shielding zones 211 and light-transparent zones 212 to cooperate with the photoresist 22 to define the dimension and shape of etched areas. The photoresist 22 may be a positive photoresist or a negative photoresist. The first etching process only can be undertaken after a plurality of steps including soft bake, exposure, and development have been completed, which are the conventional technologies and will not repeat herein.

Step S3—aligning a second mask: As shown in FIG. 2C and FIG. 2D, place a second mask 23 over the substrate 10, and align the second mask 23 to the borders of the first flattened areas 11 and first recessed areas 12. As the first etching process has been applied to the substrate 10, the second mask 23 must be precisely aligned to the substrate 10 lest errors occur in the succeeding steps to reduce light transmittance. Refer to FIG. 2A and FIG. 2C. The number of the second light-shielding zones 231 of the second mask 23 is double of that of the first light-shielding zones 211 of the first mask 21. However, the total area of the second light-shielding zones 231 and light-transparent zones 232 is equal to that of the first light-shielding zones 211. Therefore, the second light-shielding zones 231 are more densely distributed than the first light-shielding zones 211 to achieve the desired etching effect.

Step S4—undertaking a second etching process: Use the second mask 23 to undertake a second etching process to form second recessed areas 13 on the first flattened areas 11 and the first recessed areas 12 respectively, wherein each second recessed area 13 is formed at a depth smaller than that of the first recessed area 12 to form a four-step structure. In one embodiment, the second recessed area 13 is formed at a depth half that of the first recessed area 12 to form a uniform stepped structure. Similar to the first etching process, the second etching process is undertaken after the steps including a photoresist 22a coating, soft bake, exposure, and development have been completed.

Figure 2E:
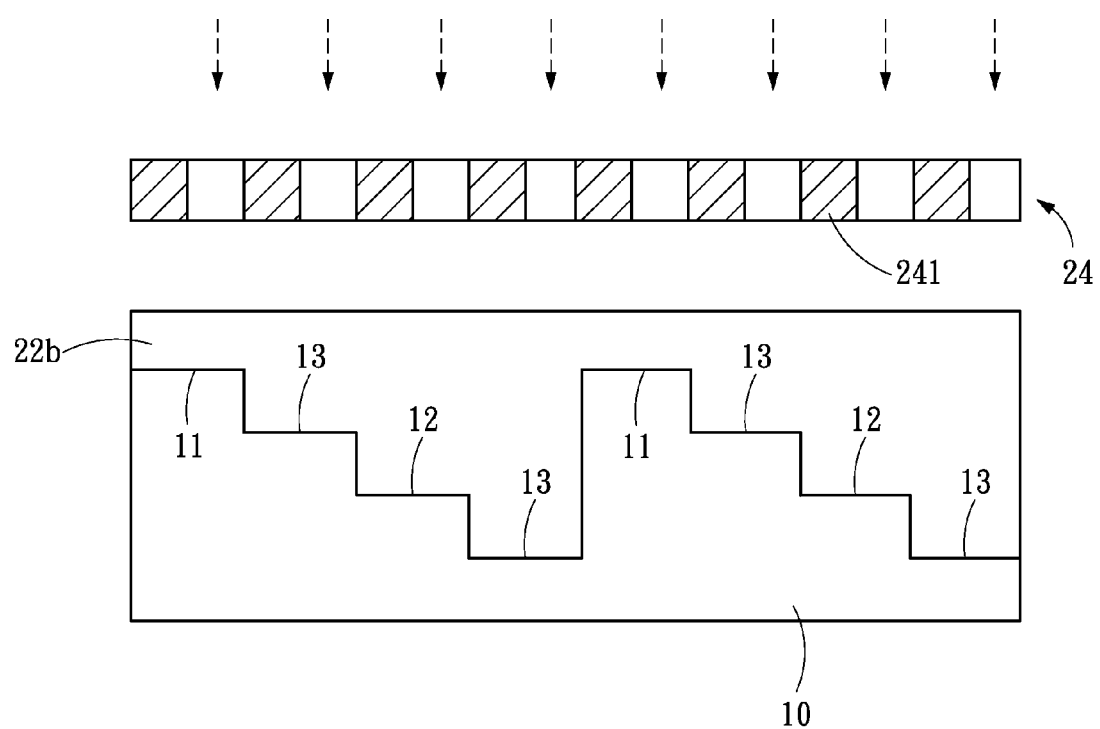
Figure 2F:
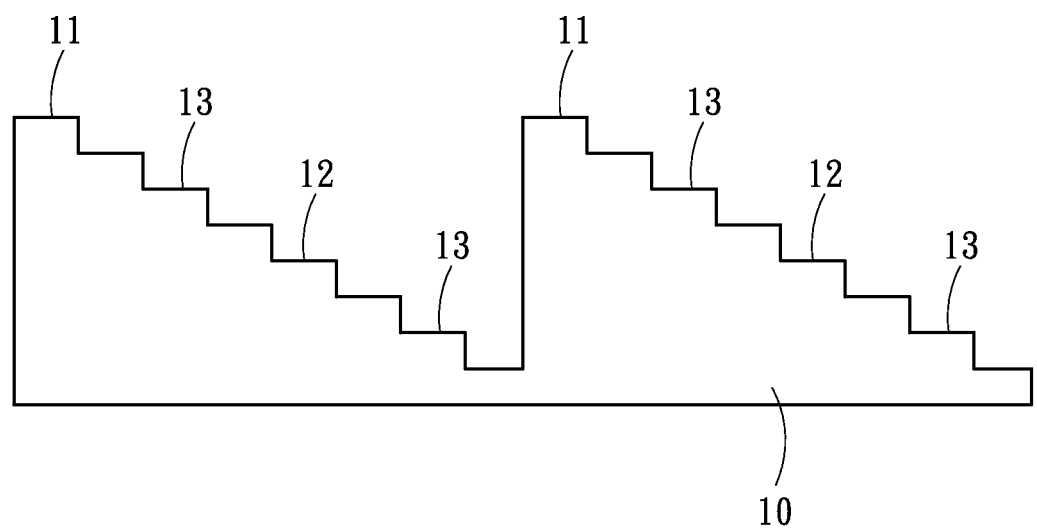

Step S5—aligning a third mask: As shown in FIG. 2E and FIG. 2F, place a third mask 24 over the substrate 10, and align the third mask 24 to the borders of the first flattened areas 11, the first recessed areas 12 and the second recessed areas 13. A photoresist 22b is coated on the substrate 10 for the succeeding etching process. The drawings of the present invention only disclose two etching processes for four-step stepped gratings. In practice, a third etching process can be used to double the number of steps. In the third etching process, the third light-shielding zones 241 of the third mask 24 are even more densely distributed than the second light-shielding zones 231 of the second mask 23. Therefore, aligning the third mask 24 is more complicated, more difficult and more time-consuming.

Step S6—undertaking a third etching process: Use the third mask 24 to undertake a third etching process to form third recessed areas 14 on the first flattened areas 11, the second recessed areas 13 of the first flattened areas 11, the first recessed areas 12, and the second recessed areas 13 of the first recessed areas 12, wherein each third recessed area 14 is formed at a depth smaller than that of the second recessed area 13 to form an eight-step structure. Preferably, the third recessed area 14 is formed at a depth half that of the second recessed area 13.

Figure 3:
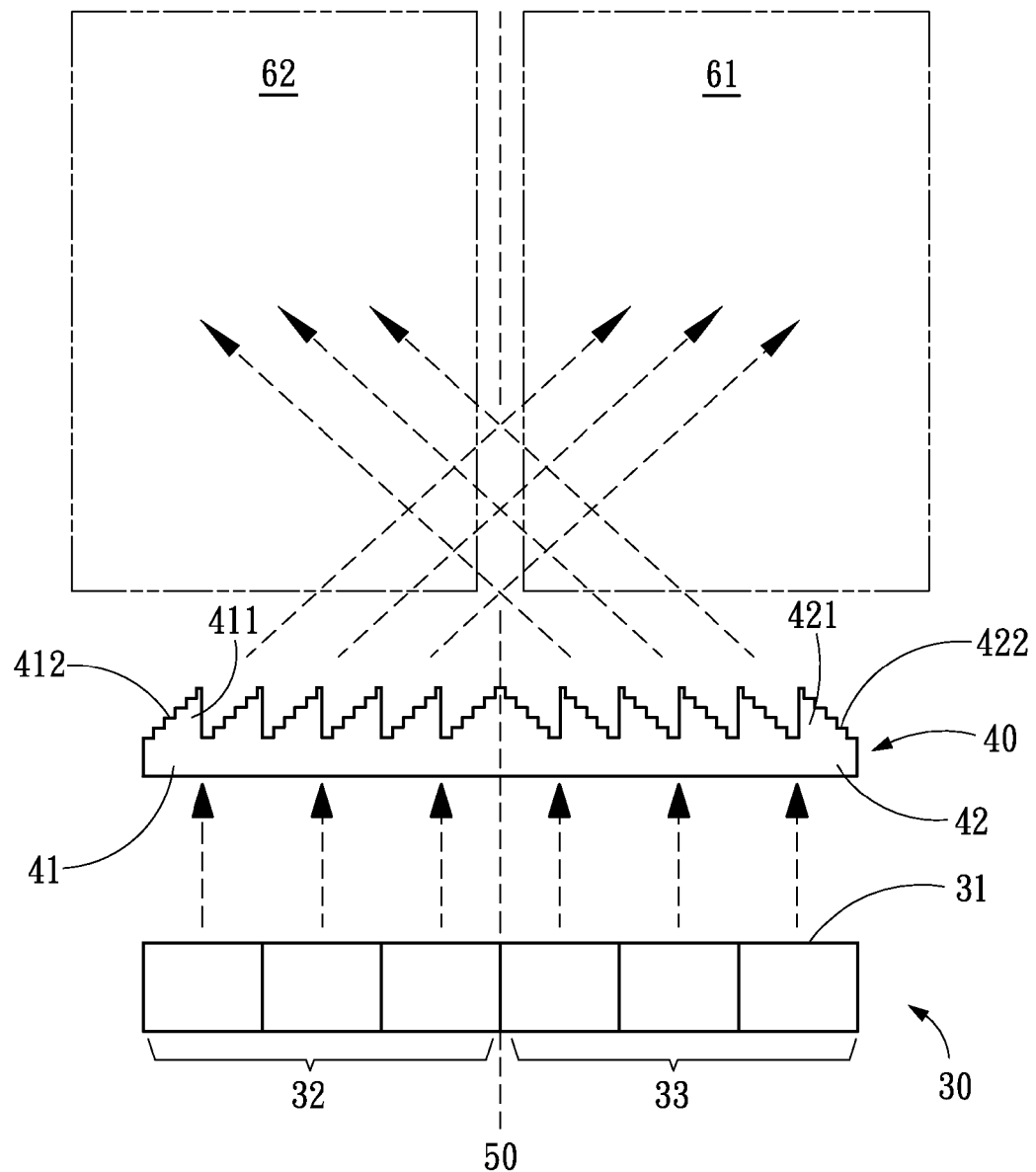
FIG. 3 is a diagram schematically showing the structure and projection of a diffraction-type 3D display element according to one embodiment of the present invention.
Figure 4:
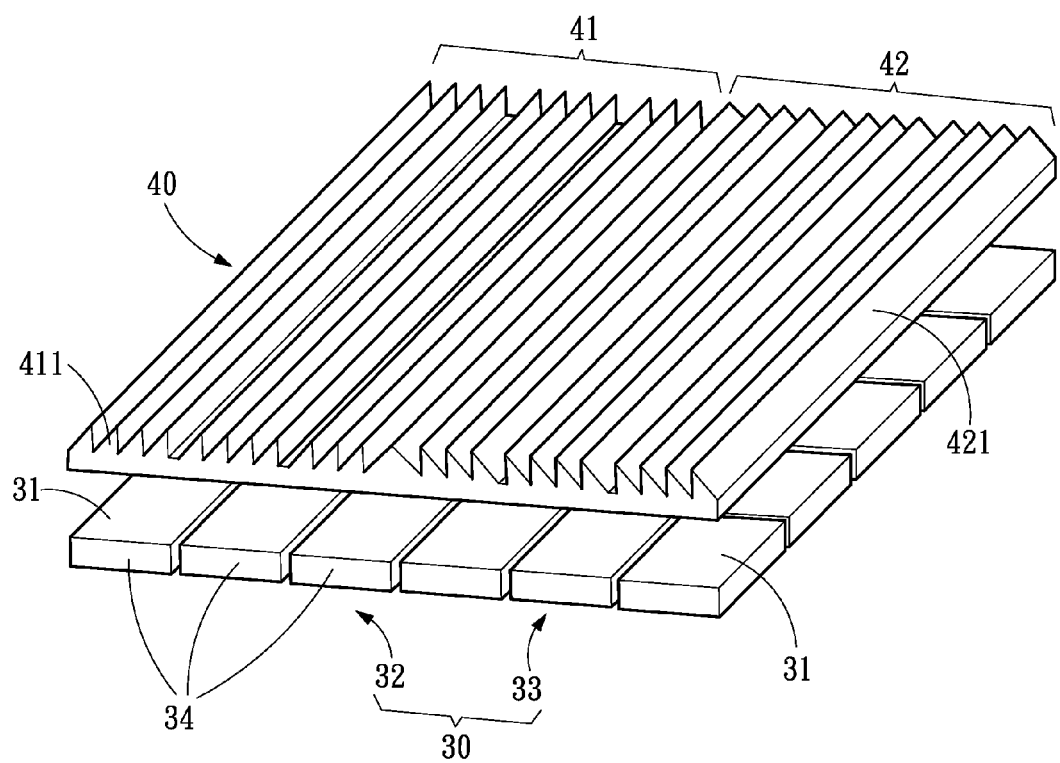
FIG. 4 is a perspective view schematically showing the structure of a diffraction-type 3D display element according to one embodiment of the present invention.

The present invention also proposes a diffraction-type 3D display element formed by the steps described above. Refer to FIG. 3 and FIG. 4. The diffraction-type 3D display element 40 of the present invention is arranged on an image output face 31 of a 3D display device 30. The diffraction-type 3D display element 40 of the present invention comprises a first diffraction area 41 and a second diffraction area 42. The first diffraction area 41 has a plurality of first stepped gratings 411 spaced apart from each other. Each first stepped grating 411 has a first stepped incline 412. The second diffraction area 42 is adjacent to the first diffraction area 41. The second diffraction area 42 has a plurality of second stepped gratings 421 spaced apart from each other. Each second stepped grating 421 has a second stepped incline 422. The second stepped gratings 421 are arranged symmetrically to the first stepped gratings 411 with a central line 50 being the symmetric axis. The stepped incline refers to an inclined plane formed by the stepped structure. Macroscopically, the stepped incline can be regarded as an inclined plane. Therefore, the stepped inclines are represented by simple straight-line inclined planes in FIG. 4 to clearly illustrate the concept of the present invention.

More specifically, the first diffraction area 41 and the second diffraction area 42 are respectively corresponding to a left-eye image output area 32 and a right-eye image output area 33 of the 3D display device 30. After receiving an image from the left-eye image output area 32, the first diffraction area 41 projects the image to a left-eye viewing field 61. Similarly, the second diffraction area 42 projects the image from the right-eye image output area 33 to a right-eye viewing field 62. The left eye and right eye of the user are respectively located at the left-eye and right-eye viewing fields 61 and 62 to receive different image signals. Thereby, the user perceives a 3D image. In one embodiment, the normals of the first and second stepped inclines 412 and 422 go far away from the central line 50; thus the first and second stepped inclines 412 and 422 form a back-to-back structure. As shown in FIG. 4, each of the left-eye image output area 32 and the right-eye image output area 33 has three primary-color output pixels 34, and each primary-color output pixel 34 is corresponding to four stepped gratings for diffracting and projecting images, it should be noted that a plurality of first diffraction areas 41 and a plurality of second diffraction areas 42 are arranged alternatively to respectively project the image of the 3D display device 30 from the first diffraction area 41 and the second diffraction area 42 to the left-eye viewing field 61 and the right-eye viewing field 62, whereby the images at different positions of the 3D display device 30 can be projected to the left-eye viewing field 61 or the right-eye viewing field 62.

Distinct from the conventional technology using prismatic lenses or cylindrical lenses to refract images, the present invention uses diffractive approach to realize 3D display technology. The diffractive optic element of the present invention can be fabricated through a micromachining technique, such as a semiconductor fabrication process or a laser micromachining process, etc., and features light weight, small volume, easy to reproduce, and low cost. Compared with the conventional grating, the stepped grating of the present invention can effectively increase diffraction efficiency and has fewer crosstalk phenomenon and higher brightness. The present invention can use merely two etching processes to form a four-step stepped grating. Therefore, the present invention has the advantages of mass production, low cost and high utility.

The embodiments described above are only to exemplify the present invention but not to limit the scope of the present invention. Any equivalent modification or variation according to the spirit of the present invention is to be also included within the scope of the present invention.

What is claimed is:

1. A method for fabricating a diffraction-type 3D display element, comprising:
   cleaning a substrate;
   undertaking a first etching process, wherein the first etching process employs a first mask which includes a plurality of first light-shielding zones and a plurality of first light-transparent zones interlaced with the plurality of first light-shielding zones to form a plurality of first flattened areas and a plurality of first recessed areas interlaced with the plurality of first flattened areas on the substrate;

aligning a second mask which includes a plurality of second light-shielding zones and a plurality of second light-transparent zones interlaced with the plurality of second light-shielding zones, wherein the second mask is aligned to borders of the first flattened areas and the first recessed areas to make each of the first flattened areas correspond to a combination of the second light-transparent zone and the second light-shielding zone, and to make each of the first recessed areas correspond to another combination of the second light-transparent zone and the second light-shielding zone; and undertaking a second etching process, wherein the second etching process employs the second mask to form second recessed areas on part of each first flattened area and part of each first recessed area that correspond to the second light-transparent zones, and wherein each second recessed area is formed at a depth smaller than that of the first recessed area to form a four-step structure.

2. The method for fabricating a diffraction-type 3D display element according to claim 1, wherein the depth of the second recessed area is half the depth of the first recessed area.

3. The method for fabricating a diffraction-type 3D display element according to claim 1 further comprising steps:

aligning a third mask, wherein the third mask is aligned to borders of the first flattened areas, the first recessed areas and the second recessed areas; and undertaking a third etching process, wherein the third mask is used to undertake the third etching process to respectively form third recessed areas on the first flattened areas, the second recessed areas in the first flattened areas, the first recessed areas, and the second recessed areas in the first recessed areas, and wherein each third recessed area is formed at a depth smaller than that of the second recessed area to form an eight-step structure.

4. The method for fabricating a diffraction-type 3D display element according to claim 3, wherein the depth of the third recessed area is half the depth of the second recessed area.

\* \* \* \* \*